United States Patent [19]

Schmitz et al.

[11] Patent Number: 4,671,497
[45] Date of Patent: Jun. 9, 1987

[54] APPARATUS AND METHOD FOR THE CONTINUOUS CALCINATION OF ALUMINUM HYDROXIDE

[75] Inventors: Christoph Schmitz, Bad Münstereifel; Istvan Kraxner, Cologne, both of Fed. Rep. of Germany

[73] Assignee: Klöckner-Humboldt-Deutz Aktiengesellschaft, Fed. Rep. of Germany

[21] Appl. No.: 702,329

[22] Filed: Feb. 15, 1985

[30] Foreign Application Priority Data

Feb. 15, 1984 [DE] Fed. Rep. of Germany ....... 3405298

[51] Int. Cl.⁴ .............................................. F27B 15/09
[52] U.S. Cl. ...................................... 266/172; 432/58
[58] Field of Search .......................... 423/600; 432/58; 266/172

[56] References Cited

U.S. PATENT DOCUMENTS 4,203,689  5/1980  Kraxner et al. ...................... 432/58
4,286,944  9/1981  Labriot et al. ....................... 432/58

FOREIGN PATENT DOCUMENTS 788920  of 0000  Canada ................................ 432/15
1184744  1/1965  Fed. Rep. of Germany .

Primary Examiner—Melvyn J. Andrews
Attorney, Agent, or Firm—Hill, Van Santen, Steadman & Simpson

[57] ABSTRACT

A method and apparatus for calcining an aluminum hydroxide source to an aluminum oxide in which the amount of the α-modification can be controlled from very low to very high values. In accordance with the present invention, the calcination of the source material takes place in two stages, in the first of which the material is preheated with air and then passed to a fluidized bed calciner after which it is delivered to a holding cyclone. In the second stage, the previously calcined material which may contain up to about 80% of the α-modification is calcined further in a rotary tubular kiln which is followed downsteam by a cooler.

4 Claims, 2 Drawing Figures

APPARATUS AND METHOD FOR THE CONTINUOUS CALCINATION OF ALUMINUM HYDROXIDE

BACKGROUND OF THE INVENTION

1. Field of the Invention

The present invention is in the field of calcining aluminum hydroxide to produce aluminum oxide, and includes a drying means for the material to be calcined, a two-stage calcining means, and a cooling means.

2. Description of the Prior Art

Calcination of aluminum hydroxide source materials was heretofore carried out in mainly two different types of calcining apparatus, in rotary tubular kilns or in so-called stationary systems such as cyclones or in fluidized bed calciners. The calcination in a rotary tubular kiln is the best known and most widely used. The rotary tubular kiln permits the production of all grades of aluminum oxide up to special alumina sources containing practically pure $\alpha$-content. When calcining in the rotary tubular kiln, however, the ratio between the energy input and the quantity of the product produced is unfavorable particularly with alumina sources containing up to about 80% of the $\alpha$-modification due to the poor energy transfer effect since there is no adequately intensive intermixture of hot gas stream and product.

The calcination of aluminum hydroxide material to aluminum oxide having an $\alpha$-content below 80% in a so-called fluidized bed reactor yields a considerable energy savings in comparison to the rotary kiln. Thus, about 25 to 30% of the specific fuel consumption can be saved when calcining the aluminum oxide source in a fluidized bed reactor. High $\alpha$-containing aluminum oxides having $\alpha$-contents over 80%, however, cannot be continuously produced in such calciners. Due to the high temperatures required, phases occur which lead to cakings and sinterings of the alumina sources and can thereby plug the calciner.

Example 3 of German AS No. 1 184 744 shows an installation wherein a three-stage cyclone heat exchanger is provided upstream of a rotary tubular kiln. In accordance with this known system, the specific heat consumption is to be lowered, so that a short duration of the heating of the aluminum hydroxide occurs with the assistance of a burner in the conduit to the cyclone stage, leading to a temperature which triggers the exothermic conversion process into the $\alpha$-modification which then proceeds autonomously. The initiation of the conversion process proceeds in a cyclone system. The rotary tubular kiln which follows downstream thereby serves only as a reaction space for the autonomous conversion of the aluminum hydroxide which then occurs. The burner provided in the rotary tubular kiln is used exclusively to compensate for the thermal losses that arise. As indicated in Example 3 of the reference, the maximum obtainable $\alpha$-proportion lies at about 70%.

SUMMARY OF THE INVENTION

The present invention provides aluminum oxides of various modifications in a particularly efficient way with a system as well as a method for operating the system.

The objective of the invention is achieved with a system for the continuous calcination of aluminum hydroxide materials in that the first stage of the calcining apparatus is composed of a fluidized bed calciner with a preceding air heater and a subsequent holding cyclone. The second stage is composed of a rotary tubular kiln which is followed downstream by a cooling means. The inventive combination of a fluidized bed calciner and a rotary tubular kiln produces the advantage that such a system has a compact structure. The fluidized bed calciner replaces that part of the rotary tubular kiln which heretofore served as a drier and precalciner and which was inefficient in terms of energy exploitation. The remaining part was limited to the high temperature range. Existing rotary tubular kilns could therefore be shortened to about one-third of their original length. Existing rotary tubular kiln systems can also be rebuilt such that one kiln part can be used as a hot zone and the following part can be used as a cooler.

In a further form of the invention, the holding cyclone in the first stage comprises two delivery means for the calcinate, whereby one delivery means is directly connected to the rotary tubular kiln by means of a conduit and the other is in direct communication with a cooling means by means of a conduit. As a consequence of the direct connection between the holding cyclone and the cooling means, it is possible to bypass the rotary tubular kiln as a part of the system when the second stage of the calcining means is not required for the production of certain grades of aluminum oxide.

In one form of the present invention, delivery valves are disposed at the holding cyclone, one of which is connected by means of a conduit to a cooling means which is independent of the cooling means which follows downstream from the rotary tubular kiln. The advantage of this form of the invention lies in that the first stage of the calcining means can be operated as an independent calcining means but together with the rotary tubular kiln represents another calcining means used for the production of an aluminum oxide grade that is different from the product from the first stage.

The method of the present invention involves calcining the aluminum hydroxide material in two successive stages in the first of which a material is produced which has a proportion of $\alpha$-form from 0 to about 80% in the first stage in a fluidized bed calciner with a preceding air heater and a following holding cyclone. Then, this product is calcined again to a higher $\alpha$-content which may reach 100% in the second stage in a rotary tubular kiln. The calcination in the first stage occurs at a lower temperature than in the second stage. The particular advantage of dividing the calcination process into two stages consists in that the calcination of the first stage in the fluidized bed calciner with preceding air heater and following holding cyclone can be carried out with an especially low specific energy consumption because the product stream and the gas stream flow in the same direction and an advantageous, intimate mixing of gas and the treated material to be calcined thus occurs. For example, in the production of a pure $\alpha$-form in a rotary tubular kiln of a traditional type, there is required a specific heat consumption of about 4600 kJ/kg of Al$_2$O$_3$, whereas only about 3200 kJ/kg are required in the system of the invention, thereby resulting in a saving of about 30% in thermal energy.

The calcining in the second stage preferably takes place in a rotary tubular kiln which is shortened to provide a high-temperature portion. The sintered phases which lead to caking and agglomeration which occur with high temperatures for producing the aluminum oxides having an α-proportion of 80 to 100% cannot plug a rotary tubular kiln. As a result of the mechanical rollover in the rotary tubular kiln, the agglomerates are advantageously comminuted and homogenized so that a homogeneous product results. With highly calcined alumina sources, the division of the process into two stages also enables a considerable energy savings. With the production of a pure α-modification in a rotary tubular kiln of a traditional type, the specific heat consumption amounts to about 5250 kJ/kg of $Al_2O_3$, whereas with the two-stage calcination of the present invention first in the fluidized bed calciner and then in the rotary tubular kiln, only about 3900 kJ/kg are required. This means a savings in thermal energy of nearly 25%.

In one modified form of the invention, the product calcined in the first stage is divided into two substreams, the first of which is subjected to a further calcination in the rotary tubular kiln and the second is cooled in a cooling means which is independent of the product of the rotary tubular kiln. The advantage of this form of the invention consists in that the use of two separate cooling apparatus makes it possible to simultaneously produce two grades of aluminum oxide side-by-side, namely, one having an α-proportion of up to about 80% and a special aluminum oxide earth having an α-proportion of up to 100%.

A further feature of the method of the invention is that the exhaust air from the rotary tubular kiln and also from the cooling apparatus which is laden with aluminum oxide dust is applied to the air heater, whereby the admission of the exhaust air into the air heater occurs outside the flame zone of a burner. The advantage is that dust is not exposed in uncontrollable fashion to a further calcination and undesired α-modifications do not enter into the product.

BRIEF DESCRIPTION OF THE DRAWINGS

A further description of the present invention will be made in conjunction with the attached sheets of drawings in which.

DESCRIPTION OF THE PREFERRED EMBODIMENTS

Figure 1:
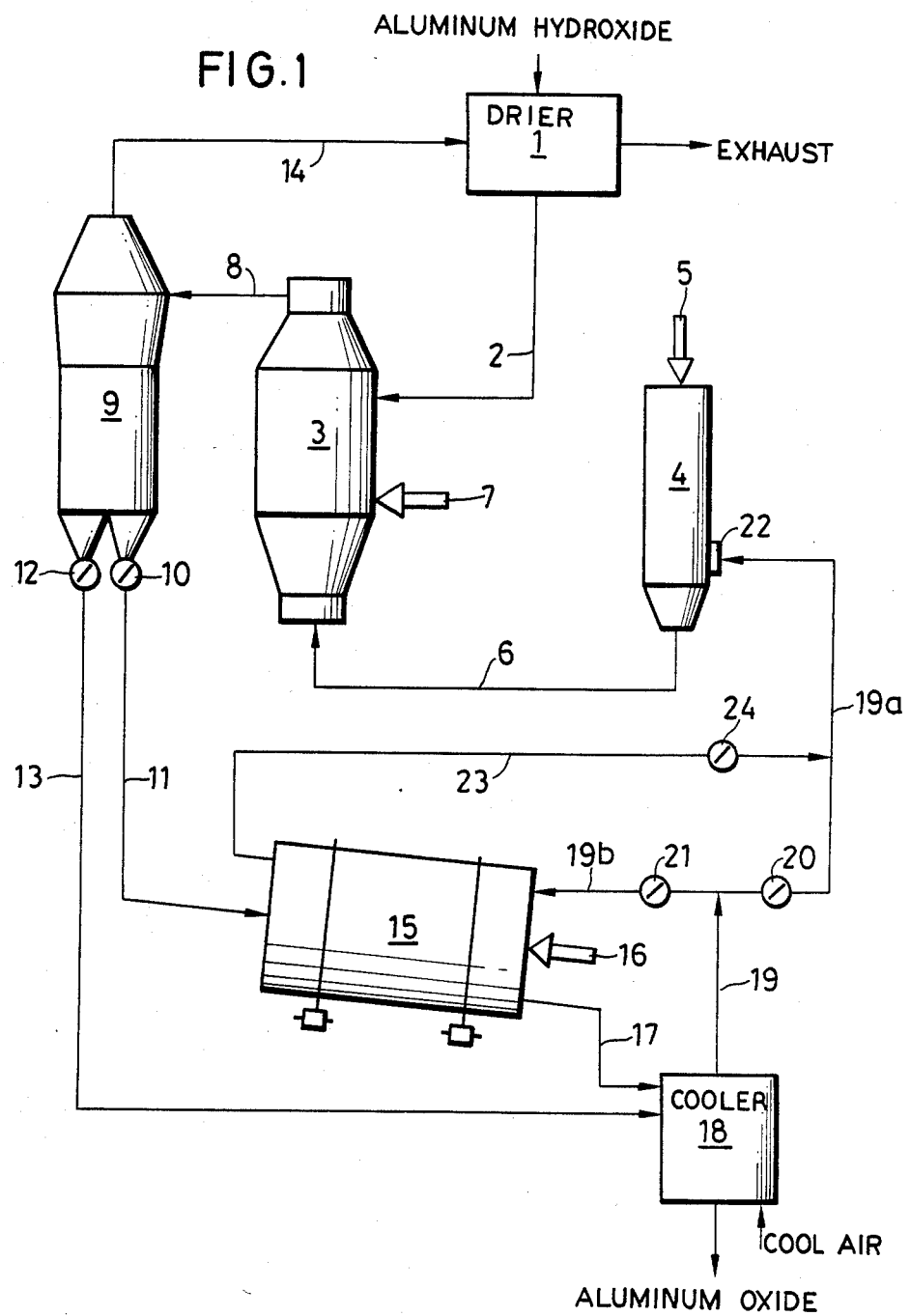
FIG. 1 is a block diagram illustrating one form of the present invention.

The calcining apparatus of the present invention may be composed of a drying means 1 of a known type which is connected by means of a conduit 2 to a fluidized bed calciner 3. The latter communicates at its input side with an air heater 4 by means of a pipeline 6 and communicates at its output side with a holding cyclone 9 by means of a pipeline 8. The air heater 4 and the fluidized bed calciner 3 are respectively equipped with burners 5 and 7, respectively. At the output side, the holding cyclone 9 has a discharge line 14 to the drying means 1 and also has two delivery valves 10 and 12. One valve, 10, is connected by means of a conduit 11 to a rotary tubular kiln 15 and the other delivery valve, 12, is connected by means of a conduit 13 to a cooling means 18 of conventional form. The rotary tubular kiln 15 is equipped with a burner 16 and communicates with the air heater 4 by means of an exhaust air conduit 23 which includes a shut-off valve 24. The product discharge 17 of the rotary tubular kiln discharges into the cooling apparatus 18. Exhaust air conduits 19, 19a and 19b provided with shut-off valves 20 and 21 lead from the cooling apparatus 18 into the rotary tubular kiln 15 and into the air heater 4.

Figure 2:
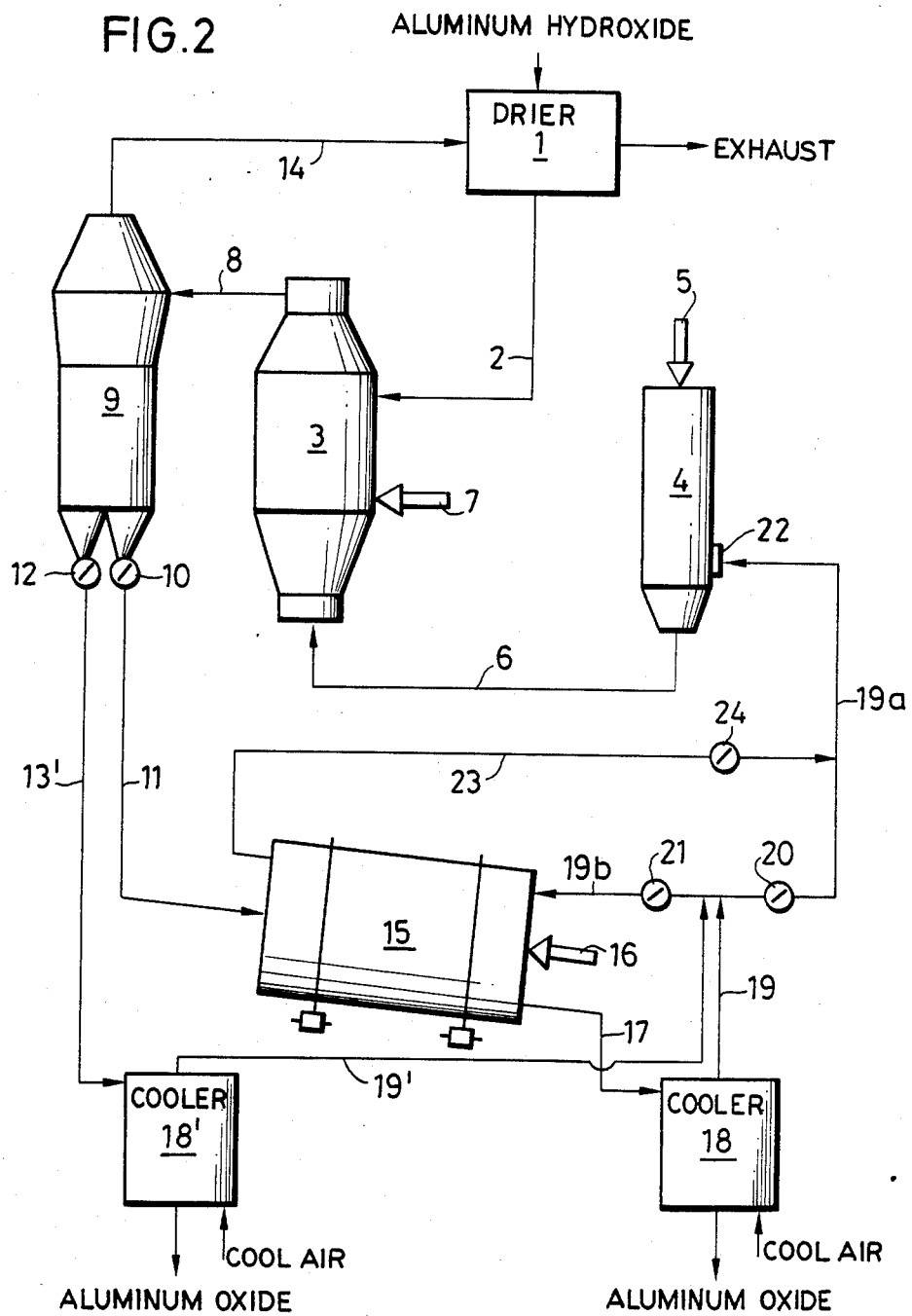
FIG. 2 is another block diagram illustrating a modified form of the invention.

A modified form of the present invention comprises two independent cooling apparatus 18 and 18' as shown in FIG. 2. In this case, one delivery valve of the holding cyclone 9 is connected by means of a pipeline 13' directly to the cooling apparatus 18' which does not follow downstream of the rotary tubular kiln 15. The outputs of both coolers 18 and 18' are directed selectively to the rotary kiln 15 or to the air heater 4.

The method involved in the operation of the present invention will be described in greater detail below.

As seen from the illustration of FIG. 1, the aluminum hydroxide source is first dried in a known fashion in a drying means 1 and is subsequently continuously supplied by means of a pipeline 2 to the fluidized bed calciner 3. A total fluidization of the particles immediately occurs and intimate contact with the hot gas is assured. On the average, the dwell time of the calciner 3 amounts to less than one second.

The fluidized bed calciner 3 is preceded upstream by an air heater 4 in which air is preheated with at least one burner 5 and is supplied by means of a conduit 6 to the fluidized bed calciner 3 in order to hold the input product in the fluidized bed. The fluidized bed calciner 3 is equipped with a burner 7 which supplies the energy required for the calcination.

As a consequence of the hot gas stream existing in the fluidized bed calciner 3, the calcined or pre-calcined product, the so-called calcinate, is supplied by means of a conduit 8 to a thermally insulated holding cyclone 9 which in terms of structure comprises a cyclone and a silo-like holding vessel disposed therebelow. The product is separated from the hot gas in the cyclone and collects in the holding vessel. The exothermic process of formation of the α-modification initiated in the fluidized bed calciner continues in this vessel.

From the holding cyclone 9, the calcinate continuously flows off in accordance with the present invention through two shut-off valves 10 and 12. Through the valve 10, the calcinate flows into the conduit 11 and through the valve 12 into the conduit 13. The off-flow rate and thus the holding time in the holding cyclone 9 may be very conveniently set with the valves 10 and 12. The off-flow rate and the holding time have an influence on the calcination process of the α-phase. The hot gas from the holding cyclone 9 is supplied by a conduit 14 to the drying means 1 for further exploitation of its thermal energy.

In accordance with the invention, the installation of FIG. 1 can be operated such that three method alternatives are present dependent on the opening of the valves 10 and 12 as well as the operation of the burner means 5, 7 and 16.

The first method alternative may be used for the production of an α-free form. For producing this grade, the heating of the air in the air heater 4 suffices. With the calcination of a pure γ-modification in the fluidized bed calciner 3, the air in the air heater 4 is heated up to about 800° C. The burner 7 of the fluidized bed calciner is thereby not in operation. In this method, the dwell time in the holding cyclone has no influence on the degree of calcination. As a rule, it amounts to a few minutes. This short time suffices for complete homogenization of the calcinate. The valve 10 of the holding cyclone 9 is closed and the aluminum oxide flows through the valve 12 by means of the conduit 13 around the non-operating rotary tubular kiln 15 and into the cooling apparatus 18 which is a known aluminum oxide cooler.

The dust-laden exhaust air emerging from the cooler apparatus 18 is conveyed by means of conduit 19 through the opened valve 20 by means of a conduit 19a to the air heater 4. It enters the air heater 4 at inlet 22 such that the dust particles do not proceed into the flame zone of a burner to be thus further calcined. In this instance, valve 21 and conduit 19b is closed.

The second method alternative serves for the production of an aluminum oxide having an α-proportion of up to 80%, for example slag or primary alumina. With this method alternative, air heated in the air heater 4 is conducted into the fluidized bed calciner 3 wherein the burner 7 is likewise operating. The temperature in the fluidized bed calciner rises to values of about 1300° C., which effect a partial conversion of the aluminum hydroxide into an α-modification. The degree of calcination can be influenced by means of the holding time in the holding cyclone 9. A calcination degree with an α-proportion of about 80% is achieved with a holding time of about 30 minutes. With this method alternative, the valve 10 is closed as in the preceding embodiment, and the rotary tubular kiln 15 is not in operation. Here, too, all of the aluminum oxide produced is directly supplied to the cooler apparatus 18 through the conduit 13 by means of the valve 12. The management of the exhaust air from the cooler apparatus 18 occurs as in the previous method alternative.

An aluminum oxide whose proportion of α-modification lies between 80 and 100% can be produced with the third method alternative. A precalcination in accordance with the second method alternative is carried out first, however, the difference being that the holding time in the holding cyclone, 9, about 30 minutes, leading to the desired modification is fully exploited and the discharge of the calcinate takes place by means of the valve 10 into the conduit 11. Valve 12 is thereby closed. The final calcination to the desired grade of aluminum oxide then takes place in the rotary tubular kiln 15. The management of the exhaust gas differs from the preceding alternatives in this case in that the dust-laden exhaust air from the cooler apparatus 18 is conducted through the opened valve 21 and the conduit 19b into the rotary tubular kiln 15 and by means of the conduit 23 and the open valve 24 into the conduit 19a which leads to the air heater 4. The valve 20 is thereby closed.

In FIG. 2 there is shown an installation which is equipped with a further cooler apparatus 18' which is independent of the cooler apparatus 18 following downstream of the rotary tubular kiln 15. The cooler apparatus 18' is connected by means of a conduit 13' to the valve 12 of the holding cyclone 9. In addition to the three alternatives already described, such a system enables a fourth alternative of the method of the invention for the purpose of producing two grades of aluminum oxide simultaneously.

The method sequence in the first stage corresponds to that in the second method alternative that has been described. In the second method stage, the calcinate flows out of the holding cyclone 9 through both valves 10 and 12 in predetermined amounts, flowing continuously by means of the conduit 11 into the rotary tubular kiln 15 and by means of the conduit 13' into the cooler apparatus 18'. The calcinate is more thoroughly calcined in the rotary tubular kiln dependent on the required quality up to an α-proportion of 100%. The calcinate discharged by means of the conduit 13' into the cooler apparatus 18' is directly cooled and an aluminum oxide having an α-proportion under 80% results. By means of combining the quantity of exhaust air from the conduits 19 and 19', the exhaust air from the two cooler apparatus 18 and 18' can be divided by means of the valves 20 and 21 in accord with the quantitative occurrence and the needs in the rotary tubular kiln 15.

It should be evident that various modifications can be made to the described embodiments without departing from the scope of the present invention.

We claim as our invention:

1. An apparatus for the continuous calcination of aluminum hydroxide comprising:

a drying means, means for introducing the aluminum hydroxide raw material into said drying means, a fluidized bed calciner receiving dried material from said drying means, an air heater supplying heated air to said calciner to provide the fluidizing medium therefor, a holding cyclone receiving the output from said calciner, first and second valve means connected to the discharge of said holding cyclone, a kiln receiving at least a portion of the output of said holding cyclone, conduit means connecting said first valve means to said kiln, a cooler means receiving the solids discharge from said kiln, and additional conduit means connecting said second valve means to said cooler means.

2. An apparatus according to claim 1 which includes conduit means directing exhaust air flow from said holding cyclone into said drying means.

3. An apparatus according to claim 1 which includes conduit means directing exhaust air from said kiln into said air heater.

4. An apparatus for the continuous calcination of aluminum hydroxide comprising:

a drying means, means for introducing the aluminum hydroxide raw material into said drying means, a fluidized bed calciner receiving dried material from said drying means, an air heater supplying heated air to said calciner to provide the fluidizing medium therefor, a holding cyclone receiving the output from said calciner, first and second valve means connected to the discharge of said holding cyclone, a kiln receiving at least a portion of the output of said holding cyclone, conduit means connecting said first valve means to said kiln, a cooler means receiving the solids discharge from said kiln and a second cooler means separate from the cooler means following said kiln, said second valve means being connected to said second cooler means.

* * * * *